(12) United States Patent
Bouttier

(10) Patent No.: US 11,909,572 B2
(45) Date of Patent: Feb. 20, 2024

(54) SYMBOL GENERATOR AND SYMBOL GENERATION METHOD

(71) Applicant: MITSUBISHI ELECTRIC CORPORATION, Tokyo (JP)

(72) Inventor: Arnaud Bouttier, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 481 days.

(21) Appl. No.: 17/278,415

(22) PCT Filed: Nov. 11, 2019

(86) PCT No.: PCT/JP2019/044982
§ 371 (c)(1),
(2) Date: Mar. 22, 2021

(87) PCT Pub. No.: WO2020/105565
PCT Pub. Date: May 28, 2020

(65) Prior Publication Data
US 2021/0359889 A1 Nov. 18, 2021

(30) Foreign Application Priority Data

Nov. 20, 2018 (EP) ..................... 18306531

(51) Int. Cl.
*H04L 27/26* (2006.01)
(52) U.S. Cl.
CPC ...... *H04L 27/2613* (2013.01); *H04L 27/2607* (2013.01); *H04L 27/2621* (2013.01); *H04L 27/2636* (2013.01); *H04L 27/2659* (2013.01)

(58) Field of Classification Search
CPC ............. H04L 27/2607; H04L 27/2613; H04L 27/2621; H04L 27/2636; H04L 27/2659
See application file for complete search history.

(56) References Cited

U.S. PATENT DOCUMENTS

| 8,005,155 B1* | 8/2011 | Lee ...................... H04L 27/2647 375/364 |
| 2007/0183370 A1* | 8/2007 | Wallace .............. H04L 27/2657 370/333 |

* cited by examiner

*Primary Examiner* — Wayne H Cai
(74) *Attorney, Agent, or Firm* — Birch, Stewart, Kolasch & Birch, LLP

(57) ABSTRACT

Embodiments include devices and methods for generating a preamble symbol and also transmitting and receiving a signal comprising the preamble symbol. It is proposed a preamble symbol which achieves a robust and simple frame detection and synchronization, quick and reliable detection of embedded signaling data at low complexity and with a low Peak to Average Power Ratio (PAPR). The proposed preamble symbol has three parts, denoted front part, central part and back part. The front part and the back parts comprise a similar correlation sequence which is used for preamble detection, coarse time synchronization and fractional frequency error estimation. While the central part comprises consecutive blocks of samples comprising a predetermined reference information and signaling data which are used for coarse frequency synchronization and conveying data.

13 Claims, 11 Drawing Sheets

SYMBOL GENERATOR AND SYMBOL GENERATION METHOD

TECHNICAL FIELD

This subject application relates to devices and methods for generating a preamble symbol and also transmitting and receiving a signal comprising the preamble symbol.

BACKGROUND ART

Orthogonal frequency division multiplexing (OFDM) technology has been widely adopted in broadband communication systems. As a promising technology, OFDM has been applied in the European second generation digital video broadcasting standard (DVB-T2) and other digital television broadcasting solutions.

In order to accommodate various application scenarios like fixed, handheld and mobile reception, DVB-T2 introduces a preamble symbol called P1 symbol which precedes each data frame of normal OFDM symbols. P1 symbol allows time and coarse frequency synchronization and carries signaling data for decoding forthcoming data.

P1 symbol conveys different signaling data by exploiting two sets of orthogonal complementary sequences which are referred to as S1 and S2. At the receiver, all the possible sequences in both sets are correlated with the received signaling sequence to find a matched case. Therefore, a large number of correlations are needed, which requires a high computational complexity for signaling detection.

However, quick and reliable detection of the signaling data is critical for a receiver to perform subsequent processing such as channel estimation and data demodulation.

Therefore, there is a need for a preamble symbol which achieves at least the same signaling purpose of P1 symbol at a lower complexity while providing equivalent or better synchronization capabilities. Further, in power constrainted contexts such as satellite transmission, there is also a need for a preamble symbol having a low Peak to Average Power Ratio (PAPR).

SUMMARY OF INVENTION

The present subject application provides devices and methods for generating a preamble symbol, as described in the accompanying claims. The subject application also provides devices and methods for transmitting and receiving a signal comprising the preamble symbol, as described in the accompanying claims.

BRIEF DESCRIPTION OF DRAWINGS

Further details, aspects and embodiments of the proposed solution will be described, by way of example only, with reference to the drawings. In the drawings, like or similar reference numbers are used to identify like or functionally similar elements. Elements in the figures are illustrated for simplicity and clarity and have not necessarily been drawn to scale. Further, in general, functional boxes illustrated with a dotted line are optional.

DESCRIPTION OF EMBODIMENTS

In order to provide a preamble symbol which achieves a robust and simple frame detection and synchronization along with quick and reliable detection of embedded signaling data at low complexity, embodiments of the present subject application proposes a preamble symbol having three parts, denoted front part, central part and back part. The front part and the back parts comprise a similar correlation sequence which is used for preamble detection, coarse time synchronization and fractional frequency error estimation. While the central part comprises consecutive blocks of samples comprising a predetermined reference information and signaling data which are used for coarse frequency synchronization and conveying data.

The subject application has the effect that conventional detection and synchronization techniques for OFDM may be immediately applied to a signal comprising the preamble of the subject application. Indeed, the preamble symbol of the subject application is a conventional OFDM-based symbol since the preamble symbol of the subject application is generated as a conventional DFT-s-OFDM symbol which is a variant of the OFDM modulation. In contrast, the P1 symbol as mentioned in the introduction is not a conventional OFDM symbol. Indeed, the P1 symbol is an OFDM symbol (denoted part 'A') with two guard intervals added, before (denoted part 'C') and after (denoted part 'B'). Part 'C' and part 'B', are the copies of the first 542 samples and the rest 482 samples of part 'A' with a predetermined shif frequency.

Further, since the preamble symbol of the subject application is generated as a conventional DFT-s-OFDM symbol, the preamble symbol can carry signaling data in parallel to reference samples where data indirectly contribute to the coarse frequency synchronization. In contrast, with the P1 symbol, sequences are used to indicate signaling and require high computational complexity.

Moreover, another advantage of the propose preamble symbol, is the ability to keep low the peak to average power ratio (PAPR) of the generated signal since the DFT-s-OFDM modulation oversamples in a circular manner the original samples to be transmitted. Indeed, this makes it particularly suitable for satellite transmission systems where it is required to operate power amplifiers at low input back-offs for saving power.

Finally, the subject application proposes a particular cyclic prefix derived from the front part of the preamble symbol, which enables to perform channel estimation.

Figure 1:
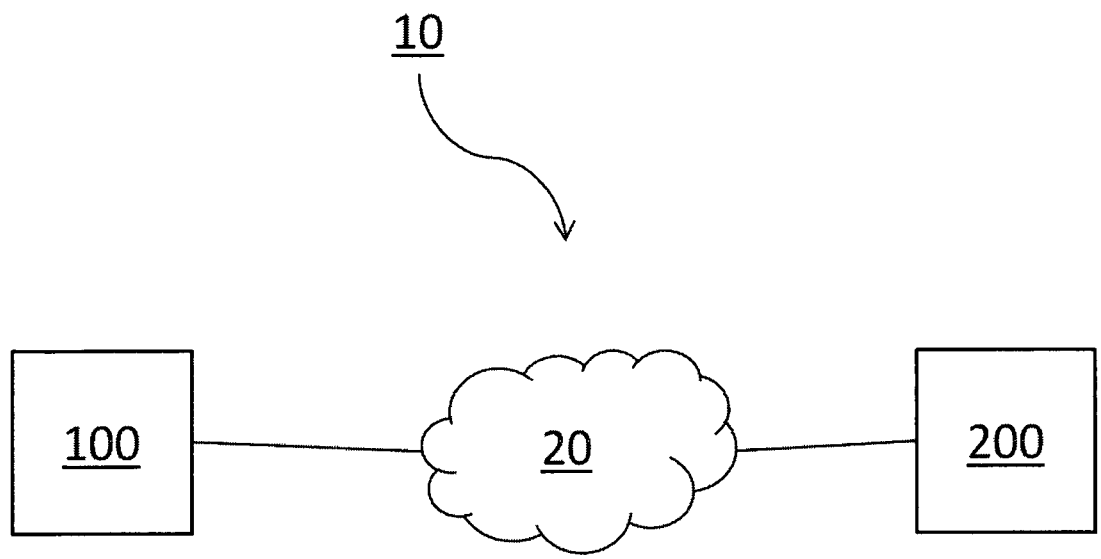
FIG. 1 is a block diagram illustrating an exemplary communication system in accordance with embodiments of the subject application.

FIG. 1 shows an exemplary communication system 10 in which the subject application is implemented. In FIG. 1, communication system 10 comprises a transmitter 100, a receiver 200 and a communication network 20. However, in general, communication system 10 may comprise more than one transmitter 100 and receiver 200.

Communication network 20 is configured for supporting data transfer between transmitter 100 and receiver 200. In an example, communication network 20 is a satellite or a terrestrial communication network. However, other communication networks can be contemplated such as broadcast communication networks.

Figure 2:
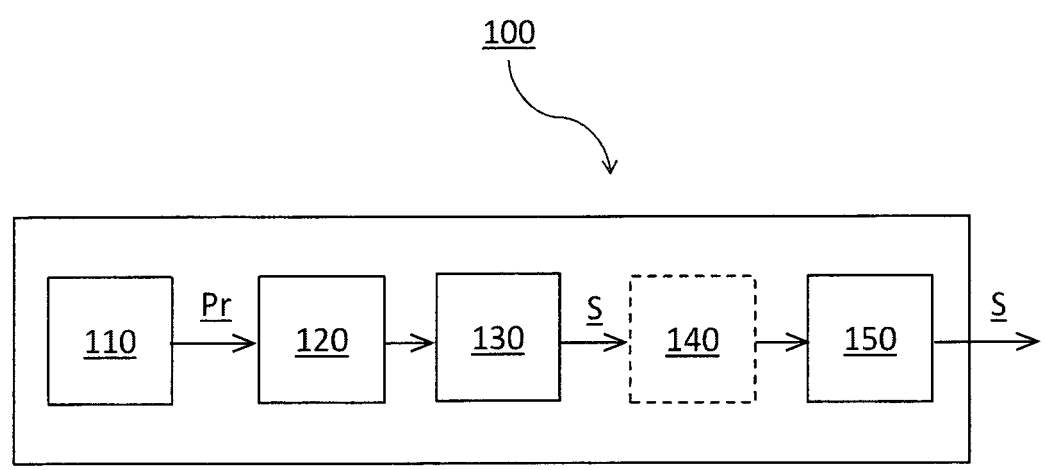
FIG. 2 is a block diagram illustrating an exemplary transmitter in accordance with embodiments of the subject application.

FIG. 2 shows an exemplary transmitter 100 which can be used with the proposed subject application. In FIG. 2, transmitter 100 comprises a symbol generator 110, a signal frame processor 120, a modulation processor 130, a transmitting unit 150.

In the subject application, signal frame processor 120, modulation processor 130 and transmitting unit 150 are conventional processors, such as those used in conventional broadband communication systems.

When transmitter 100 is in operation, symbol generator 110 is configured for generating at least one preamble symbol Pr. Further, signal frame processor 120 is configured for providing at least one signal frame comprising at least one of the generated preamble symbol Pr.

Figure 2A:
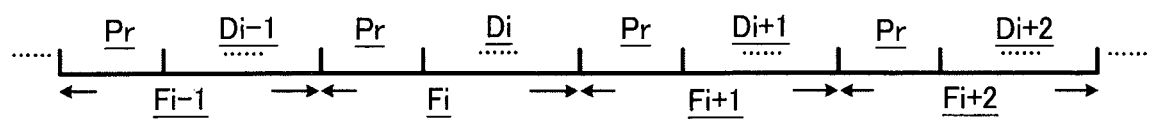
FIG. 2A shows an exemplary plurality of signal frames in accordance with embodiments of the subject application.

FIG. 2A shows an exemplary plurality of signal frames Fi−1, Fi, Fi+1, Fi+2, each comprising a preamble symbol Pr and a data frame Di−1, Di, Di+1, Di+2. In FIG. 2A, preamble symbol Pr is located at the beginning of signal frames Fi−1, Fi, Fi+1, Fi+2. However, in another embodiment, preamble symbol Pr may be located at the end of signal frames Fi−1, Fi, Fi+1, Fi+2. In that case preamble symbol Pr is known as a postamble.

Returning to FIG. 2, modulation processor 130 is configured for modulating the signal frame according to a predetermined multiplexing scheme, thereby creating a modulated signal S. In an example, the predetermined multiplexing scheme is a code division multiplexing (CDM), a time division multiplexing (TDM), a frequency division multiplexing (FDM) or orthogonal frequency division multiplexing (OFDM). However, other multiplexing scheme known by the person skilled in the art of broadband communication systems, may be contemplated.

Finally, transmitting unit 150 is configured for transmitting modulated signal S over at least one transmission channel.

In an embodiment, transmitter 100 further comprises a cyclic prefix processor 140 configured for:
  providing the modulated signal S with a cyclic prefix part, and
  inserting, in the time domain, cyclic prefix pilot samples into the cyclic prefix part of the modulated signal.
  In particular, the cyclic prefix pilot samples include a copy of a predetermined plurality of oversampled time-domain samples associated with front pilot samples of the front part of preamble symbol Pr. More details regarding the oversampled time-domain samples will be provided below in connection with FIG. 3.

Figure 2B:
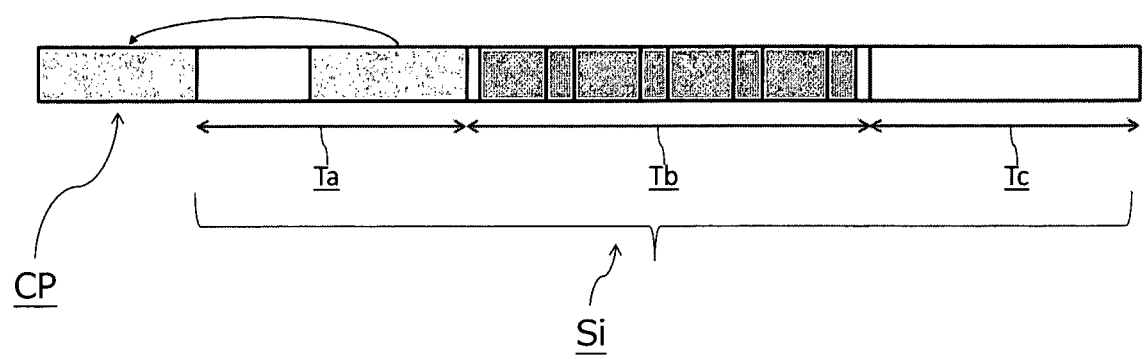
FIG. 2B shows a modulated signal associated with a signal frame of FIG. 2A.

FIG. 2B shows a modulated signal Si associated with signal frame Fi of FIG. 2A with a cyclic prefix CP appended at the beginning of modulated signal Si. In the example of FIG. 2B, the cyclic prefix pilot samples correspond to a copy of the end samples of the front part of preamble symbol Pr of signal frame Fi which are inserted before modulated signal Si.

Figure 3:
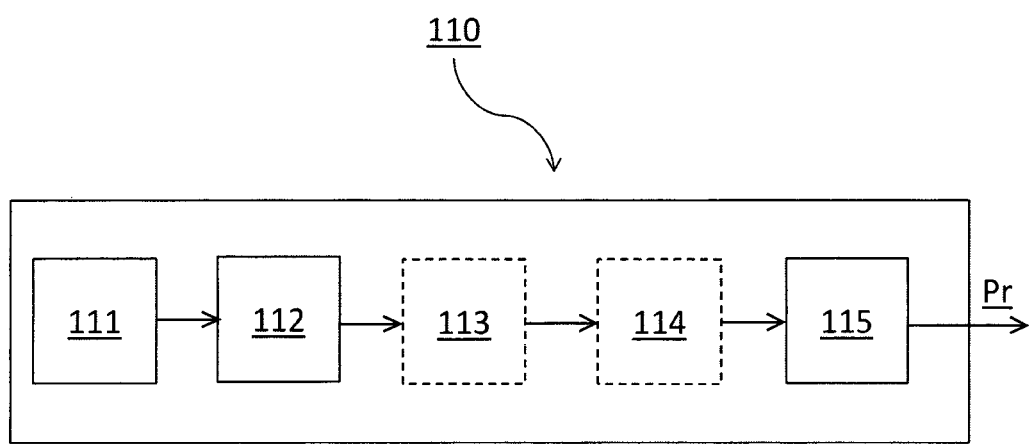
FIG. 3 is a block diagram illustrating an exemplary symbol generator in accordance with embodiments of the subject application.

FIG. 3 shows an exemplary symbol generator 110 which can be used for generating at least one preamble symbol Pr. In FIG. 3, symbol generator 110 comprises a buffer 111, a symbol processor 112 and a modulation processor 115.

In the subject application, buffer 111, symbol processor 112 and modulation processor 115 are conventional processors, such as those used in conventional broadband communication systems.

When symbol generator 110 is in operation, buffer 111 is configured for providing a vector having a front part, a center part and a back part.

Figure 3A:
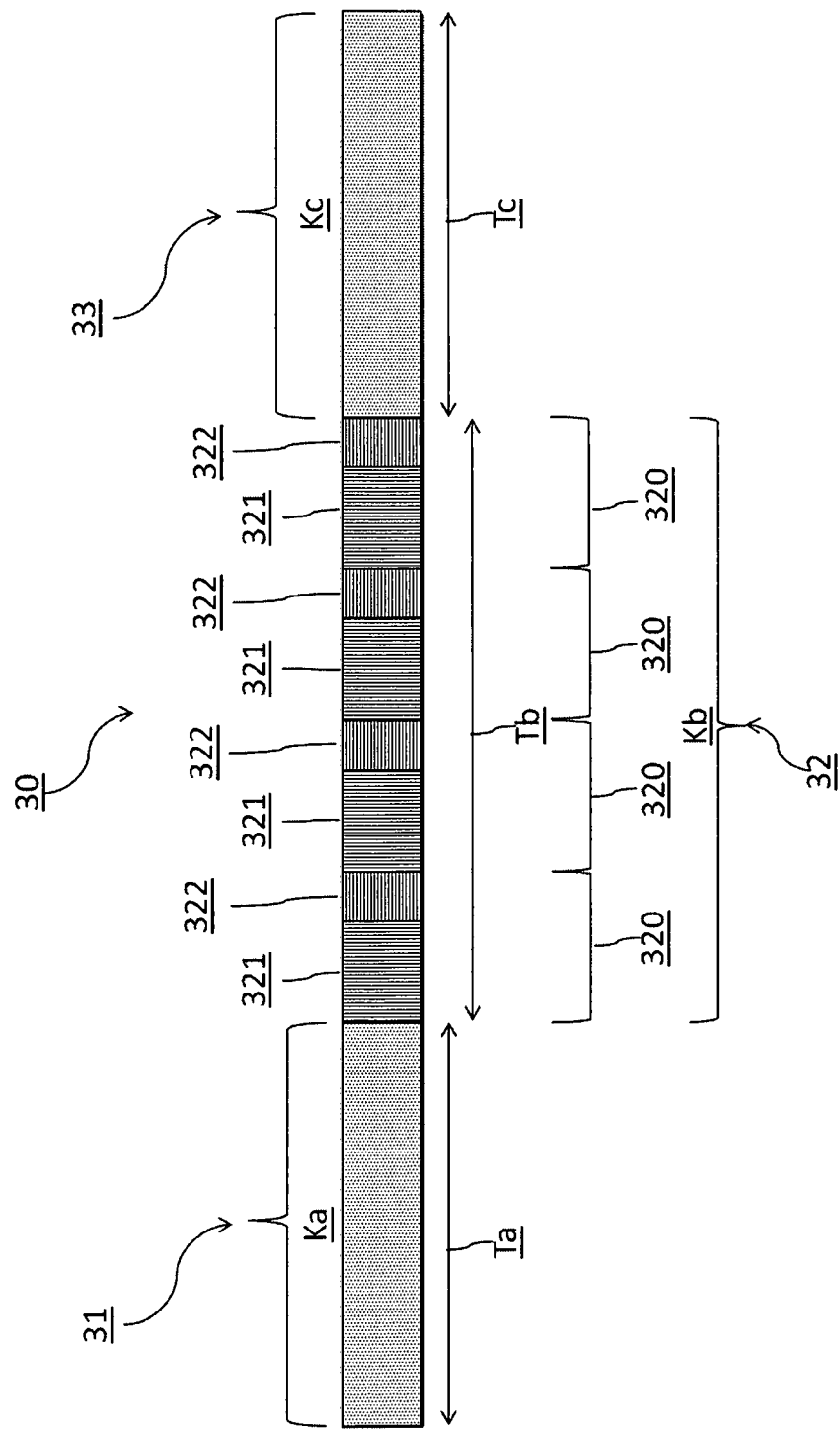
FIG. 3A shows exemplary vectors in accordance with embodiments of the subject application.

FIG. 3A shows an exemplary vector 30 comprising a front part 31, a center part 32 and a back part 33. In FIG. 3A, center part 32 is arranged in a plurality of consecutive blocks 320 each including a first part 321 and a second part 322, where the size of second part 322 may equals zero. In the example of FIG. 3A, front part 31 comprises Ka samples, center part 31 comprises Kb samples and back part 33 comprises Kc samples. Therefore, vector 30 comprises K samples where $$K=Ka+Kb+Kc \qquad (1).$$

Further, in connection with FIGS. 3 and 3A, symbol processor 112 is configured for inserting, in the time domain,
  front pilot samples into front part 31,
  a plurality of consecutive blocks of samples into center part 32, and
  back pilot samples into back part 33.

In particular, the front pilot samples and the back pilot samples are configured to carry a similar correlation sequence. In other words, as shown in FIG. 3A, front part 31 and back part 33 comprise similar set of samples. In an example, front part 31 and back part 33 comprise the same set of samples such that Ka=Kc. In an example, the correlation sequence is a constant amplitude zero auto correlation (CAZAC) sequence, a pseudo-noise sequence, a pseudorandom binary sequence or any other suitable correlation sequence with good correlation and low power fluctuations properties.

Further, each of the plurality of consecutive blocks of samples is arranged in a first portion and a second portion, which are configured to respectively match first part 321 and second part 322. In addition, each first portion includes pilot samples which are configured to carry a predetermined reference information and at least one of the second portion includes data samples which are configured to carry signaling data. In an example, the signaling data comprises transmission parameters such as a fast Fourier transform (FFT) size, single-input/single-output and multiple-input/single-output transmission modes, and so on. In another example, the signaling data comprises a Transmission Parameter Signaling such as those used in digital video broadcasting technologies. In yet another example, where part of the second portion include data samples, one may stuff the remaining second portions with a variety of predetermined stuffing. In practice, the predetermined stuffing may be a repetition of a known sequence such as a PRBS sequence.

In an embodiment, each of the plurality of consecutive blocks of samples comprises the same number of samples Kbl. In a first example, the number of K samples of vector 30 is an integer. In a second example, the number of K samples of vector 30 is a multiple of Kbl. In that case the number of consecutive blocks of samples is defined by:

$$P = \text{floor}\left(\frac{K - (Ka + Kc)}{Kbl}\right). \tag{2}$$

where floor(x) is the greatest integer less than or equal to x.

Returning to FIG. 3, modulation processor 115 is configured for performing a DFT-spread-OFDM modulation of vector 30 according to a predetermined oversampling rate.

In particular, the time-domain samples of vector 30 are converted into the frequency domain by a discrete Fourier transform (DFT) operation, thereby creating frequency-domain samples. At that moment, the frequency-domain samples are associated with groups of subcarriers of a multicarrier communication channel. Further, the frequency-domain samples are converted into the time domain by an inverse discrete Fourier transform (IDFT) operation, thereby creating oversampled time-domain samples.

Indeed, in DFT-spread-OFDM modulation the time domain samples are first spread in frequency by means of a DFT. After addition of null sub-carriers at the two band edges, the spread symbols are OFDM modulated by means of an IDFT to obtain a time domain signal with the expected spectral shape. The combination of a DFT for spreading and an IDFT for modulation, provides a resulting signal that may be simply understood as the oversampled version of the original samples that would be filtered out with a Dirichlet waveform, also known as Dirichlet kernel, the equivalent in DFT interpolation of the cardinal sine function or sinc function in continuous time interpolation.

In other words, according to the example of FIG. 3A, modulation processor 115 oversamples the samples included in each of front part 31, center part 32 and back part 33 at an oversampling rate of N/K such as to obtain N points per OFDM symbol period. Hence, in the example of FIG. 3A (not shown), the oversampled version of front part 31 would comprises Na samples (with Na=Ka*N/K), the oversampled version of center part 31 would comprises Nb samples (with Nb=Kb*N/K) and the oversampled version of back part 33 would comprises Nc samples (with Nc=Kc*N/K). Therefore, the oversampled version of vector 30 comprises N samples where $$N = Na + Nb + Nc \tag{3}$$

Further, in the example of FIG. 3A, the duration of the oversampled version of front part 31 would be equal to Ta (with Ta=Ka*N/K*Ts, where Ts is the sampling period after the DFT-spread-OFDM modulation), the duration of the oversampled version of center part 31 would be equal Tb (with Tb=Kb*N/K*Ts) and the duration of the oversampled version of back part 33 would be equal to Tc (with Tc=Kc*N/K*Ts). Therefore, the duration of the oversampled version of vector 30 is equal to $$T = Ta + Tb + Tc \tag{4}$$

In one embodiment of symbol generator 110, buffer 111 is further configured for providing front part 31 with a cyclic postfix part and back part 33 with a cyclic prefix part.

Figure 3B:
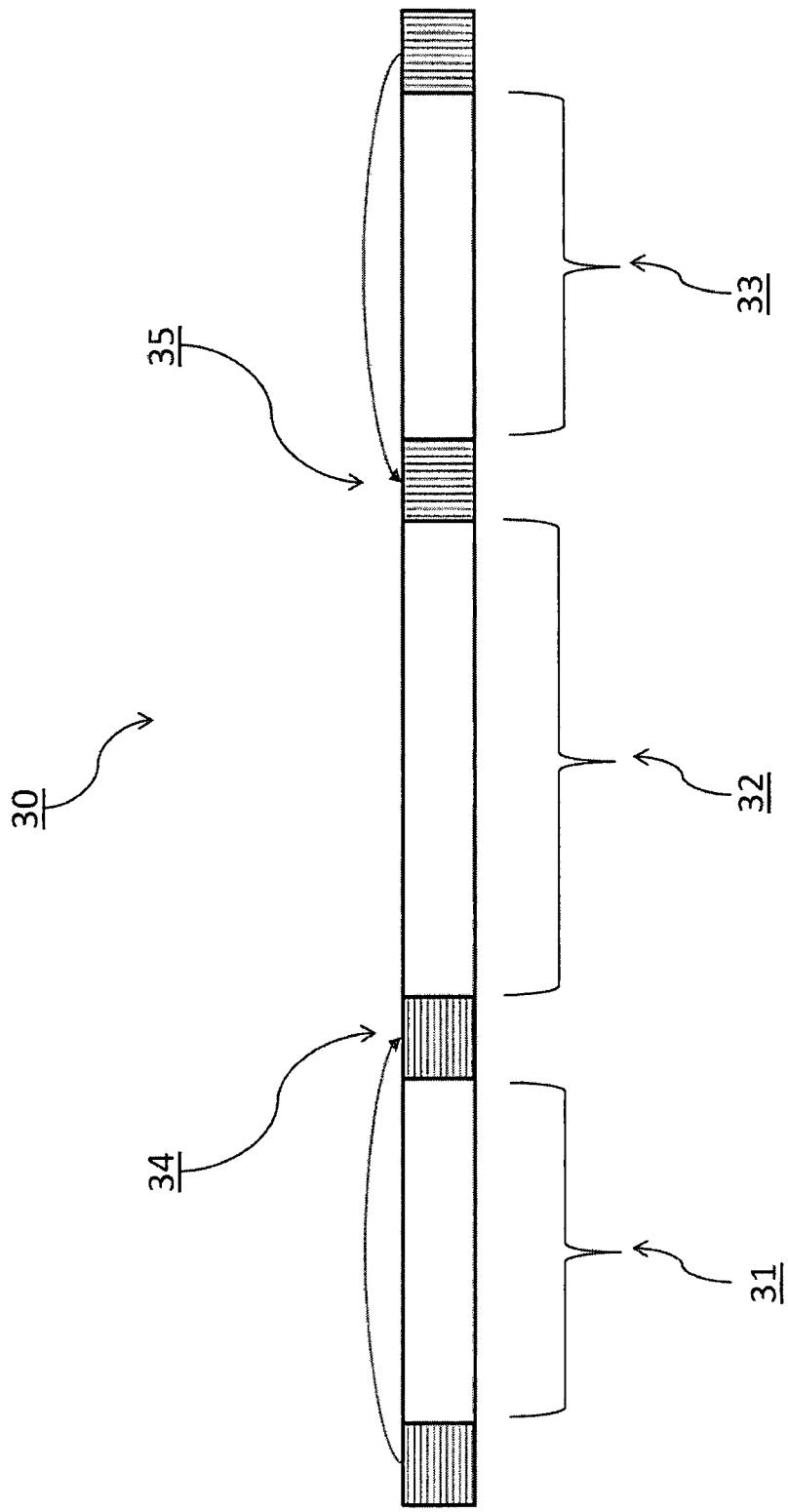
FIG. 3B shows exemplary vectors in accordance with embodiments of the subject application.

FIG. 3B shows vector 30 comprising a cyclic postfix part 34 and a cyclic prefix part 35. The example of FIG. 3B takes into account the fact that front part 31 and back part 33 are not totally equal after the DFT-spread-OFDM modulation. This is due to oversampling operation which is applied circularly such that front part 31 and back part 33 spread over each other respectively, and that front part 31 and back part 33 are both interfered by the central part 32. That situation leads to a degradation of the performance of autocorrelation operation at receiver 200, as described below.

Hence the example of FIG. 3B has the effect of obtaining more or less the same spreading effect on both ends of front part 31 and back part 33. Indeed, a few samples are necessary in practice to strongly correlate the corresponding two parts of the signal over the durations Ta and Tc. The amount of samples to be introduced shall be established as a trade-off between the robustness of the time synchronization using front part 31 and back part 33 and the frequency synchronization conducted using central part 32. This approach can be viewed as an extension of the duration of the front part 31 and back part 33 but where the part used for computing the correlation is actually smaller than the full duration of both parts.

Further, in connection with FIGS. 3 and 3B, symbol processor 112 is further configured for inserting, in the time domain:
cyclic postfix pilot samples into cyclic postfix part 34, and
cyclic prefix pilot samples into cyclic prefix part 35.

In particular, the cyclic postfix pilot samples include a copy of a predetermined plurality of front pilot samples of the front part. Further, the cyclic prefix pilot samples include a copy of a predetermined plurality of back pilot samples of the back part. In the example of FIG. 3B, the cyclic postfix pilot samples correspond to a copy of the beginning samples of front part 31 which are inserted after front part 31. Further, the cyclic prefix pilot samples correspond to a copy of the end samples of back part 33 which are inserted before back part 33.

In another embodiment of symbol generator 110, prior to performing the DFT-spread-OFDM modulation, symbol generator 110 further comprises a scrambling unit 113. Scrambling unit 113 is configured for scrambling the plurality of consecutive blocks of samples of the preamble symbol, according to a predetermined scrambling sequence. In an example, the predetermined scrambling sequence is a pseudo-random sequence.

Figure 3C:
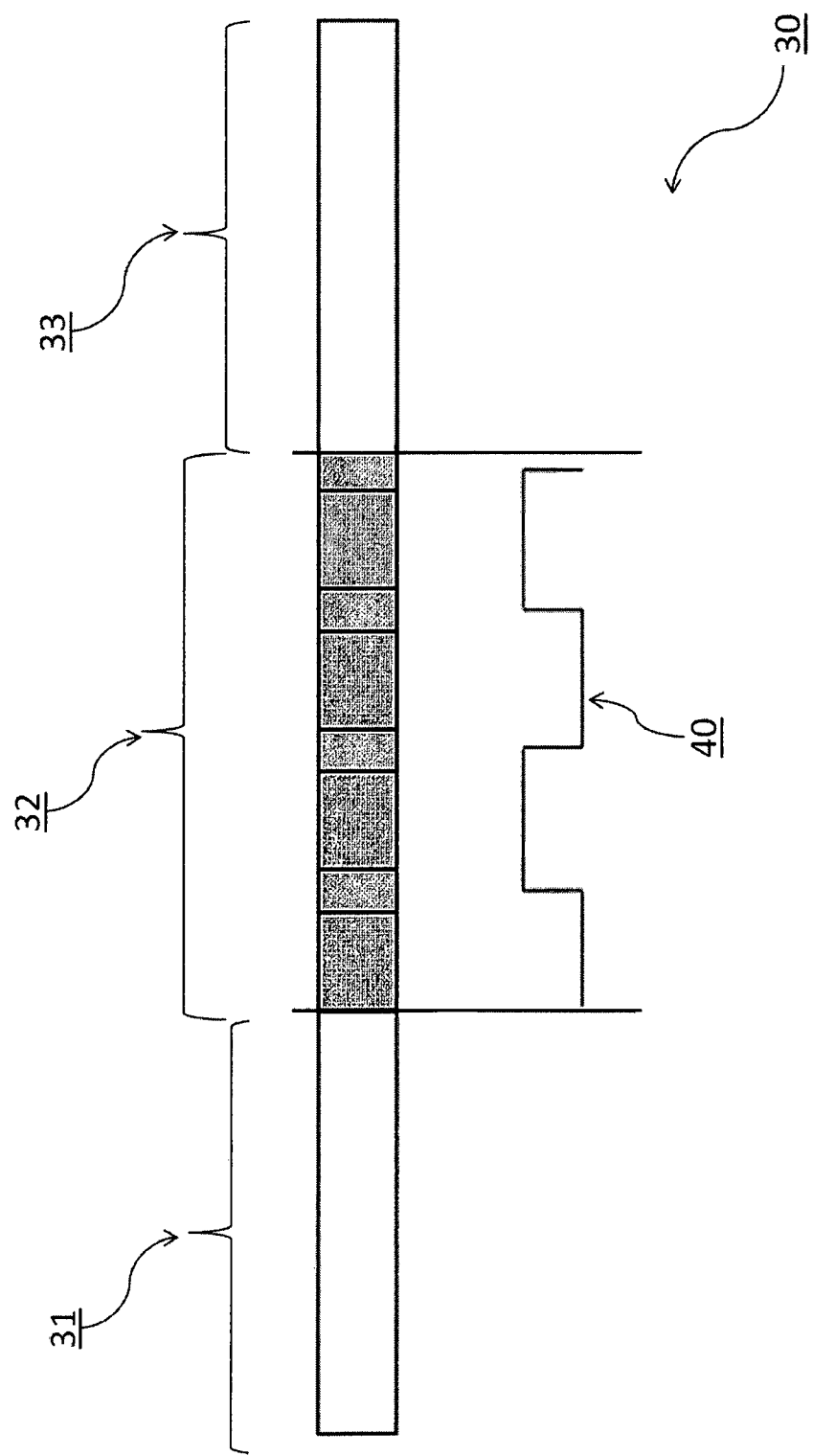
FIG. 3C shows exemplary vectors in accordance with embodiments of the subject application.

FIG. 3C shows vector 30 comprising and a scrambling sequence 40. As will be explained below, the scrambling operation has the effect of reducing out-of-band (OOB) radiation at the receiver level, by smoothing the spectral lines that will appear in the spectrum of the preamble symbol due to the repetition pattern present in central part 32.

With reference to FIG. 3A, it is known that with the DFT-spread-OFDM modulation, the K original samples of vector 30 would appear in the final continuous time signal but would not generally be part of the N generated samples. For instance, the normalized position of the first sample of the back part 33 is given by:

$$\tau = \frac{N}{K} \times (K_A + K_B). \tag{5}$$

Further, the first sample of back part 33 would belong to the N generated samples only if τ is an integer. Therefore, in order to position the samples of back part 33 onto integer positions, one may apply a negative delay value according to:

$$\Delta \tau = \frac{N}{K} \times (K_A + K_B) - \text{floor}\left(\frac{N}{K} \times (K_A + K_B)\right). \quad (6)$$

where floor(x) is the greatest integer less than or equal to x.

The negative delay value ΔT may be applied in the time domain or in the frequency domain.

For example, in the time domain, prior to performing the DFT-spread-OFDM modulation, symbol generator 110 further comprises a delay unit 114. Delay unit 114 is configured for delaying in the time domain, the time-domain samples of back part 33 such that the first original sample associated with back part 33 is aligned onto a sampling time point of the DFT-spread-OFDM modulation, just as the first original sample associated with front part 31 is aligned onto a sampling time point of the DFT-spread-OFDM modulation.

In another example, in the frequency domain, modulation processor 115 is further configured for performing a separate DFT-spread-OFDM modulation for the back part 33 from the DFT-spread-OFDM modulation for the front part 31 and the central part 31. In addition, symbol generator 110 further comprises a linear phase shifter (not shown). The linear phase shifter is configured for applying in the frequency domain, a linear phase shift to the frequency-domain samples associated with the back part 33 such that the first original sample associated with back part 33 is aligned onto a sampling time point of the DFT-spread-OFDM modulation, just as the first original sample associated with front part 31 is aligned onto a sampling time point of the DFT-spread-OFDM modulation. Finally, symbol generator 110 may add the output signals obtained from the separate DFT-spread-OFDM modulations, by taking advantage of the linearity of the DFT-spread-OFDM modulation.

Figure 4:
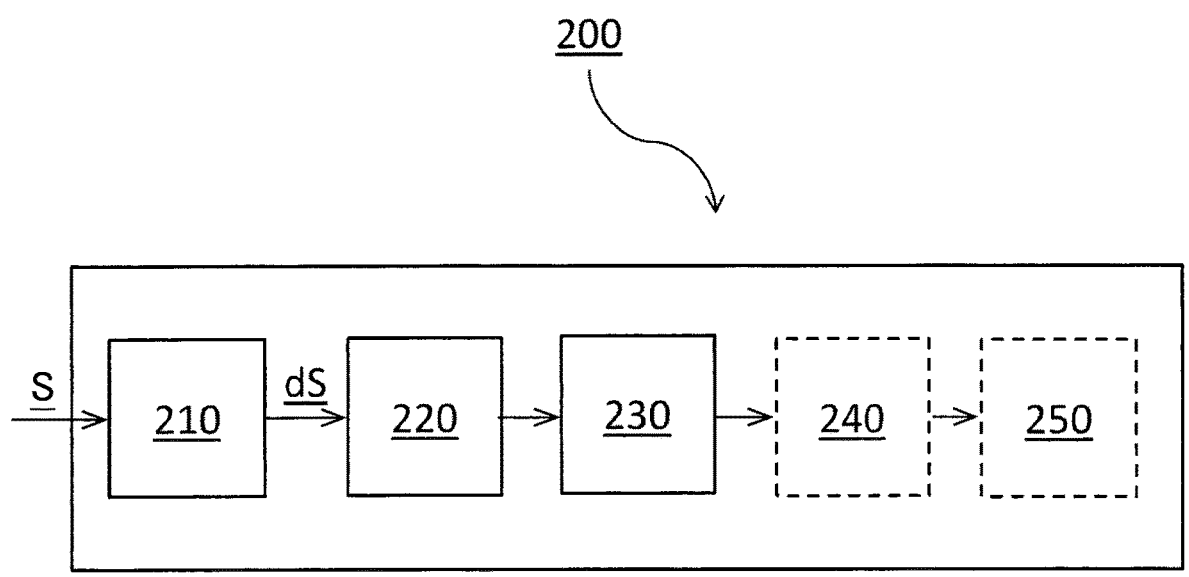
FIG. 4 shows an exemplary receiver in accordance with embodiments of the subject application.

Let's now turn to FIG. 4 which shows an exemplary receiver 200 which can be used to receive signal S as transmitted by transmitter 100. In FIG. 4, receiver 200 comprises a demodulation unit 210, a signal frame detector 220 and a channel estimator 230.

In the subject application, signal frame detector 220 and channel estimator 230 are conventional processing units, such as those used in conventional broadband communication systems. Further, in an embodiment, signal frame detector 220 is also configured for applying a predetermined descrambling sequence onto received signal S, wherein the predetermined descrambling sequence is associated with the predetermined scrambling sequence used at the transmitter level. In practice the size of the predetermined descrambling sequence need to be adapted to received signal S. The foregoing descrambling operation has the effect of restoring the periodic character of the repetition pattern present in central part 32, later on facilitating the performing of coarse frequency synchronization.

When receiver 200 is in operation, demodulation unit 210 is configured for demodulating received signal S, thereby creating a demodulated signal dS. Further, signal frame detector 220 is configured for detecting a signal frame from demodulated signal dS, the signal frame comprising preamble symbol Pr as generated by symbol generator 110.

In particular, the detection of the signal frame comprises performing coarse time synchronization based on calculating an autocorrelation value between demodulated signal dS and a delayed version of the demodulated signal. In that case, the delayed version of the demodulated signal is imparted with a predetermined delay such that front part 31 of preamble symbol Pr of demodulated signal dS matches back part 33 of preamble symbol Pr of the delayed demodulated signal. In an example, the predetermined delay is defined by:

$$\Delta d = (K - KC) * (N/K) * Ts \quad (7).$$

In the subject application, a coarse time synchronization aims at obtaining a rough synchronization timing and also a characteristic relating to the carrier frequency offset. In that case, the coarse time synchronization can be obtained by searching for the peak of correlation in modulus. Further, it is known that, in case there exists a frequency shift between a receiver and a transmitter, the phase of the complex sample at the maximum of the correlation also gives the so-called fractional part of the shift with respect to the correlation delay.

Figure 4A:
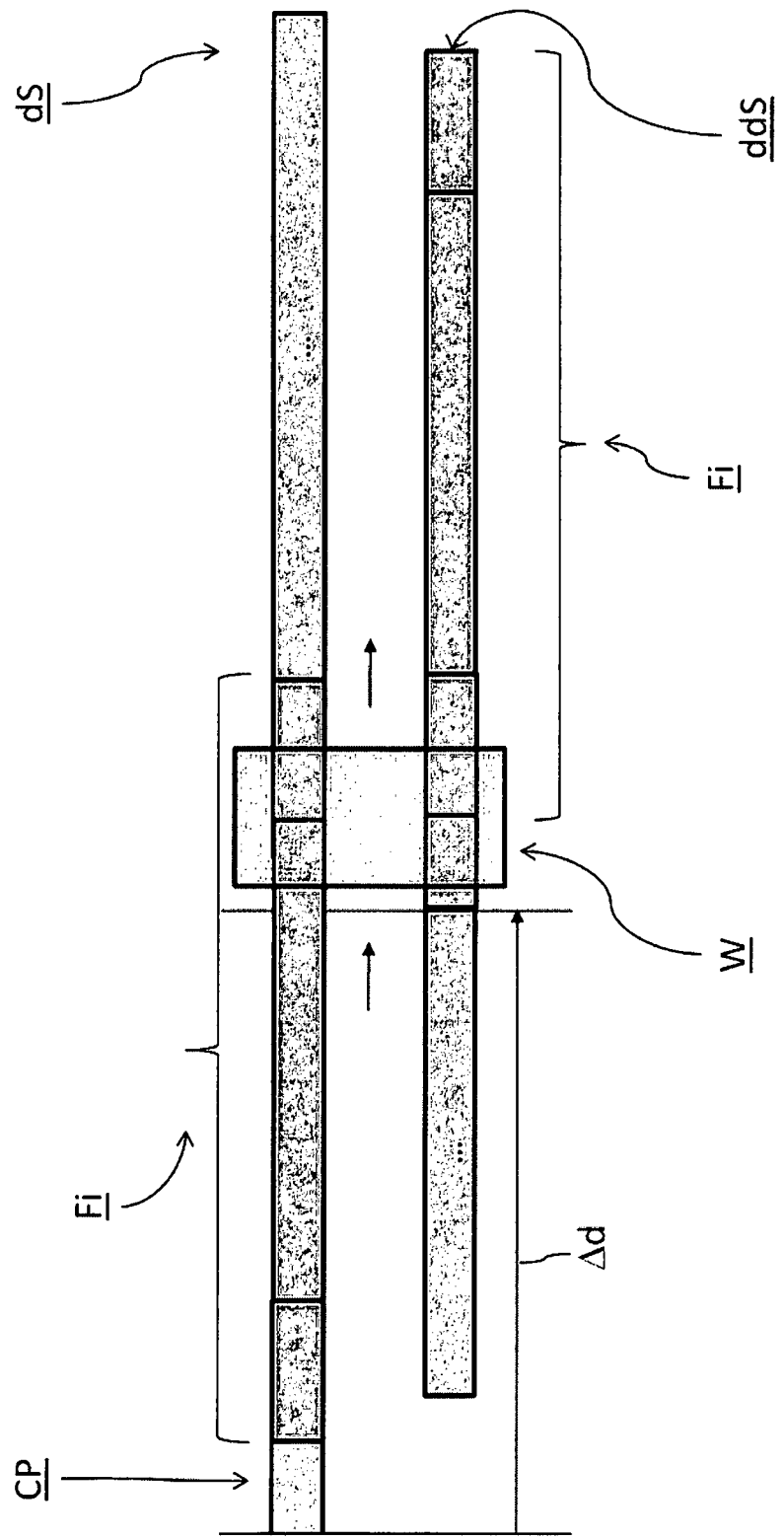
FIG. 4A is a block diagram illustrating an exemplary demodulated signal and a delayed version of the demodulated signal in accordance with embodiments of the subject application.

In connection with FIG. 2B and FIG. 4, FIG. 4A shows an exemplary demodulated signal dS and a delayed version ddS of the demodulated signal dS. FIG. 4A also illustrates predetermined delay Δd and a conventional sliding correlation window W as commonly used in conventional correlation and peak detection methods.

Returning back to FIG. 4, channel estimator 230 is configured for, after the detection of the signal frame, performing a channel estimation based on the cyclic prefix part of the signal frame and preamble symbol Pr. Indeed, as shown in FIG. 2B, the particular cyclic prefix of the subject application is related to the front pilot samples of front part 31 instead of being related to the overall signal frame. Hence, channel estimator 230 can extract the front pilot samples of front part 31 of preamble symbol Pr, and use it as a reference OFDM symbol for channel estimation. In that case, the correlation sequence carried by the front pilot samples should be known at receiver 200. According to this principle, channel estimator 230 is able to estimate the channel using a short OFDM symbol. Said channel estimation can be performed at regularly spaced sub-carriers, in some sense similarly to scattered OFDM pilots, still keeping the good PAPR properties of the generated signal. The following publication provide further details regarding channel estimation: A. Bouttier and J. Guillet, "A low-PAPR low-pilot overhead Reference Signal for the DFT-spread OFDM Modulation," 2018 *25th International Conference on Telecommunications (ICT)*, St. Malo, 2018, pp. 110-115.

Moreover, descrambling unit 440 is configured for, after the detection of the signal frame, descrambling the second portion of the plurality of consecutive blocks of samples of preamble symbol Pr according to a predetermined scrambling sequence. In that case, the predetermined scrambling sequence used at the transmitter level should be known at receiver 200. In an embodiment, the descrambling can be applied for different timing offsets without suffering from a possible time synchronization error.

Now that coarse time synchronization is done, a coarse frequency synchronization can be performed.

In the subject application, the coarse frequency synchronization aims at estimating the possible shift that may exist between transmitter 100 and receiver 200 carrier frequencies. However, at that point, it is assumed that the fractional frequency error has been removed from the received signal. Then, it is simply needed to detect the integer part of the frequency shift by averaging the amplitude of the frequency-domain samples modulo the number of blocks of samples. In that case, the integer part of the frequency error is thus given by the index of the maximum of the averaged amplitude.

In an embodiment of receiver 200, in connection with FIG. 4, receiver 200 further comprises a signal processor 250. Signal processor 250 is configured for:

zeroing out the samples associated with front part 31 and back part 33 of preamble symbol Pr, thereby obtaining an altered preamble symbol, converting, by a DFT operation, the oversampled time-domain samples of the altered preamble symbol, into frequency-domain samples, and performing coarse frequency synchronization based on averaging the amplitude of the frequency-domain samples which are associated with each of the plurality of consecutive blocks of samples of the altered preamble symbol.

It should be understood that the arrangement of central part 32 of preamble symbol Pr is meant to enable the detection of the integer frequency shift by means of a DFT performed on the received preamble symbol Pr with zeroing of the edge parts. Indeed, one would notice that, after the DFT operation, the resulting signal comprises frequency-domain samples contains spectral lines every sub-carriers associated to each block of samples. In that case, the number of samples carrying the signaling data results in a predetermined level of noise located below the level of the spectral lines. Further, the insertion of signaling data achieves several other purposes, such as allowing to carry signalling data, adjusting the length of repetition period, and controlling the level of OOB radiation.

Finally, once channel estimation, coarse time synchronization and coarse frequency synchronization are performed, receiver 200 is able to extract the signaling data from the signal frame with a high level of performance, thus allowing a reduction of the redundancy required for encoding signaling data. In addition, the knowledge of the channel estimates allows receiver 200 for demodulating the subsequent symbols without the need of inserting a dedicated pilot symbol.

Figure 5:
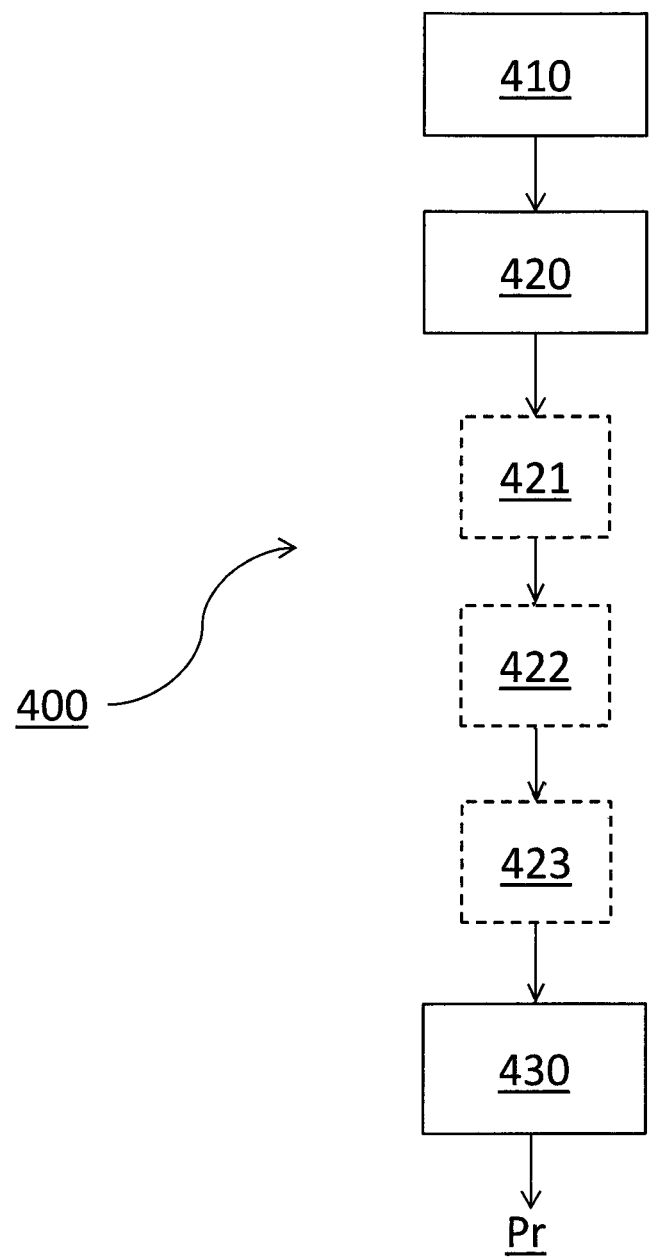
FIG. 5 is a flow chart of a symbol generation method in accordance with an embodiment of the subject application.
Figure 6:
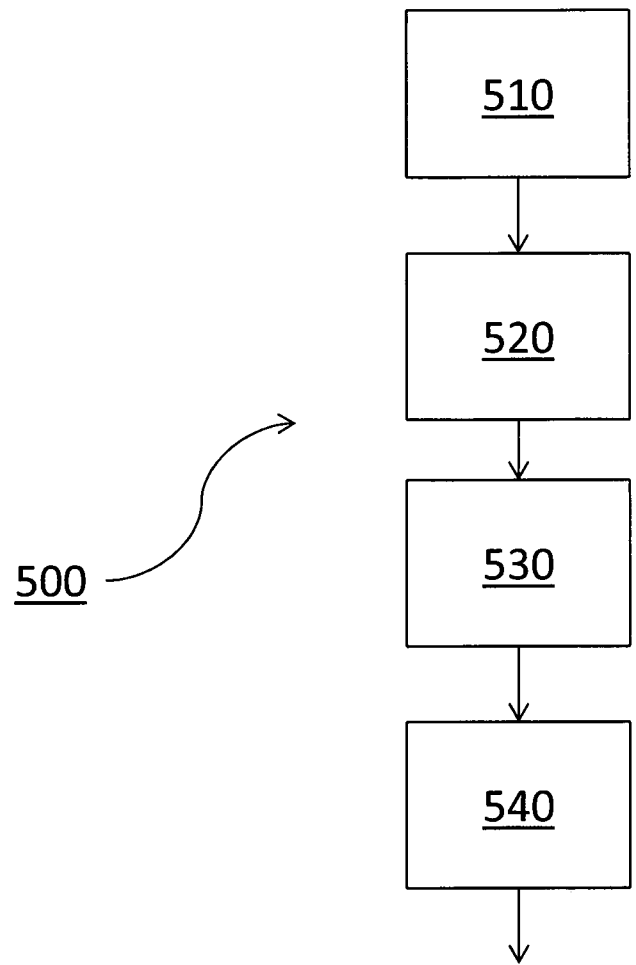
FIG. 6 is a flow chart of transmission method in accordance with an embodiment of the subject application.
Figure 7:
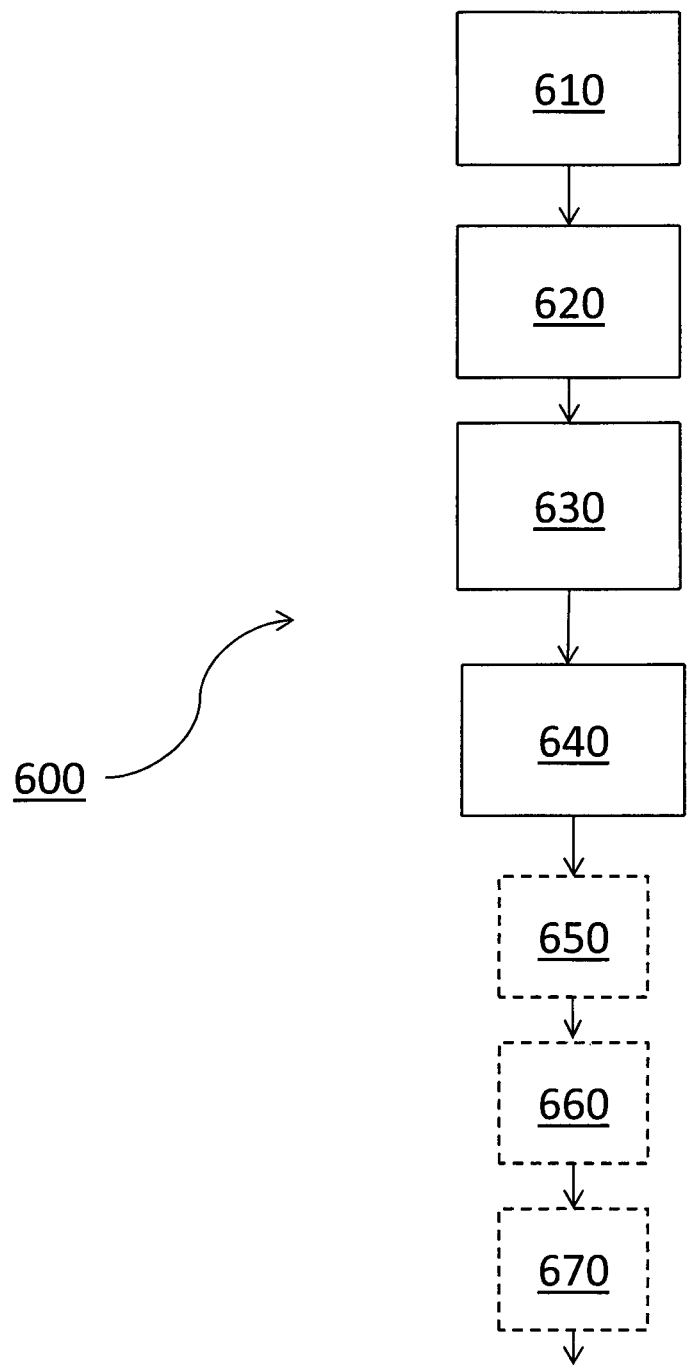
FIG. 7 is a flow chart of a reception method in accordance with an embodiment of the subject application.

For a better understanding of the present subject application, reference will now be to the FIGS. 5, 6 and 7 showing embodiments of methods implementing the proposed solution.

FIG. 5 illustrates a symbol generation method 400 for generating preamble symbol Pr, as already explained above. The symbol generation method 400 may include, at 410, providing a vector 30 with a front part 31, a center part 32 and a back part 33, the center part being arranged in a plurality of consecutive blocks 320, each including a first part 321 and a second part 322, at 420, inserting in the time domain,
front pilot samples into the front part,
a plurality of consecutive blocks of samples into the center part,
back pilot samples into the back part,
wherein the front pilot samples and the back pilot samples are configured to carry a similar correlation sequence, and
wherein each of the plurality of consecutive blocks of samples is arranged in a first portion and a second portion which are configured to respectively match first part 321 and second part 322, where each first portion includes pilot samples which are configured to carry a predetermined reference information and where at least one of the second portion includes data samples which are configured to carry signaling data, and, optionally, at 421, where the front part comprises a cyclic postfix part and the back part comprises a first cyclic prefix part, the symbol generation method 400 further comprises, inserting, in the time domain:
cyclic postfix pilot samples into the cyclic postfix part of front part 31, and
cyclic prefix pilot samples into the first cyclic prefix part of back part 33,
wherein the cyclic postfix pilot samples include a copy of a predetermined plurality of front pilot samples of front part 31, and
wherein the cyclic prefix pilot samples include a copy of a predetermined plurality of back pilot samples of back part 33, optionally, at 422, prior to performing the DFT-spread-OFDM modulation, the symbol generation method 400 further comprises, scrambling the plurality of consecutive blocks of samples of the preamble symbol, according to a predetermined scrambling sequence, and optionally, at 423, prior to performing the DFT-spread-OFDM modulation, the symbol generation method 400 further comprises, delaying in the time domain, the time-domain samples of the back part such that the first original sample associated with back part 33 is aligned onto a sampling time point of the DFT-spread-OFDM modulation, just as the first original sample associated with front part 31 is aligned onto a sampling time point of the DFT-spread-OFDM modulation, at 430, performing a DFT-spread-OFDM modulation of the vector according to a predetermined oversampling rate, wherein,
the time-domain samples of the vector are converted into the frequency domain by a discrete Fourier transform (DFT) operation, thereby creating frequency-domain samples, and
the frequency-domain samples are converted into the time domain by an inverse discrete Fourier transform (IDFT) operation, thereby creating oversampled time-domain samples, and optionally (not shown), performing the DFT-spread-OFDM modulation comprises:
performing a separate DFT-spread-OFDM modulation for the back part, and
applying in the frequency domain, a linear phase shift to the frequency-domain samples associated with the back part such that the first original sample associated with back part 33 is aligned onto a sampling time point of the DFT-spread-OFDM modulation, just as the first original sample associated with front part 31 is aligned onto a sampling time point of the DFT-spread-OFDM modulation.

FIG. 6 illustrates a transmission method 500 for generating transmitting signal S, as already explained above. The transmission method 500 may include, at 510, providing preamble symbol Pr according to the symbol generation method 400, at 520, providing at least one signal frame comprising the generated preamble symbol Pr, at 530, modulating the signal frame according to a predetermined multiplexing scheme, thereby creating a modulated signal, and at 540, transmitting the modulated signal over at least one transmission channel, wherein the signal frame comprises a cyclic prefix part and wherein creating the signal frame comprises, inserting, in the time domain, cyclic prefix pilot samples into the cyclic prefix part of the signal frame, wherein the cyclic prefix pilot samples includes a copy of a predetermined plurality of front pilot samples of the front part of the preamble symbol.

FIG. 7 illustrates a reception method 600 for receiving signal S transmitted according the transmission method 500, as already explained above. The reception method 600 may include, at 610, demodulating the received signal S, thereby creating a demodulated signal, at 620, detecting a signal frame from the demodulated signal, the signal frame comprising the preamble symbol Pr generated according to the symbol generation method 400, wherein the detecting of the signal frame comprises performing coarse time synchronization based on calculating an autocorrelation value between the demodulated signal dS and a delayed version of the demodulated signal, as already explained above, at 630, after the detecting of the signal frame, performing a channel estimation based on the cyclic prefix part of the signal frame and the preamble symbol, and at 640, after the detecting of the signal frame, descrambling the plurality of consecutive blocks of samples of the preamble symbol, according to a predetermined scrambling sequence.

In embodiments of the reception method 600, it is further included, at 650, zeroing out the samples associated with the front part and the back part of the preamble symbol, thereby obtaining an altered preamble symbol, at 660, converting, by a DFT operation, the oversampled time-domain samples of the altered preamble symbol, into frequency-domain samples, and at 670, performing coarse frequency synchronization based on averaging the amplitude of the frequency-domain samples which are associated with each of the plurality of consecutive blocks of samples of the altered preamble symbol.

The above-proposed methods may also be performed by a computer program embodied in a non-transitory computer readable storage medium. Hence, it is also claimed a computer program product comprising instructions that can be executed by a computer system in order to carry out the above-proposed methods.

The invention claimed is:

1. A symbol generator for generating at least one preamble symbol, the symbol generator comprising:
a buffer for providing a vector having a front part, a center part and a back part, the center part being arranged in a plurality of consecutive blocks each including a first part and a second part,
a symbol processor for inserting, in a time domain,
front pilot samples into the front part,
a plurality of consecutive blocks of samples into the center part,
back pilot samples into the back part,
wherein the front pilot samples and the back pilot samples are configured to carry a similar correlation sequence, and
wherein each of the plurality of consecutive blocks of samples is arranged in a first portion and a second portion which are configured to respectively match the first part and the second part of the center part, where each first portion includes pilot samples which are configured to carry a predetermined reference information and where at least one of the second portion includes data samples which are configured to carry signaling data, and a first modulation processor for performing a DFT-spread-OFDM modulation of the vector according to a predetermined oversampling rate, wherein
time-domain samples of the vector are converted into the frequency domain by a discrete Fourier transform, DFT, operation, thereby creating frequency-domain samples, and
the frequency-domain samples are converted into the time domain by an inverse discrete Fourier transform, IDFT, operation, thereby creating oversampled time-domain samples.

2. The symbol generator according to claim 1, wherein
the buffer is further configured for providing the front part with a cyclic postfix part and the back part with a first cyclic prefix part, and
the symbol processor is further configured for inserting, in the time domain:
cyclic postfix pilot samples into the cyclic postfix part, and
cyclic prefix pilot samples into the first cyclic prefix part,
wherein the cyclic postfix pilot samples include a copy of a predetermined plurality of front pilot samples of the front part, and
wherein the cyclic prefix pilot samples include a copy of a predetermined plurality of back pilot samples of the back part.

3. The symbol generator according to claim 1, further comprising, prior to performing the DFT-spread-OFDM modulation, a scrambling unit for scrambling the plurality of consecutive blocks of samples of the preamble symbol, according to a predetermined scrambling sequence.

4. The symbol generator according to claim 1, further comprising, prior to performing the DFT-spread-OFDM modulation, a delay unit for delaying in the time domain, the time-domain samples of the back part such that a first original sample associated with the back part is aligned onto a sampling time point of the DFT-spread-OFDM modulation, just as a first original sample associated with the front part is aligned onto a sampling time point of the DFT-spread-OFDM modulation.

5. The symbol generator according to claim 1, wherein
the first modulation processor is further configured for performing a separate DFT-spread-OFDM modulation for the back part, and
the symbol generator further comprising a linear phase shifter for applying in the frequency domain, a linear phase shift to the frequency-domain samples associated with the back part such that a first original sample associated with the back part is aligned onto a sampling time point of the DFT-spread-OFDM modulation, just as a first original sample associated with the front part is aligned onto a sampling time point of the DFT-spread-OFDM modulation.

6. A transmitter for transmitting a signal, the transmitter comprising:
the symbol generator according to claim 1 for generating at least one preamble symbol,
a signal frame processor for providing at least one signal frame comprising the generated preamble symbol,
a second modulation processor for modulating the signal frame according to a predetermined multiplexing scheme, thereby creating a modulated signal, and
a transmitting unit for transmitting the modulated signal over at least one transmission channel.

7. The transmitter according to claim 6, further comprising a cyclic prefix processor for:

providing the modulated signal with a second cyclic prefix part, and inserting, in the time domain, cyclic prefix pilot samples into the second cyclic prefix part of the modulated signal, wherein the cyclic prefix pilot samples includes a copy of a predetermined plurality of oversampled time-domain samples associated with the front pilot samples of the front part of the preamble symbol.

8. A symbol generation method of generating a preamble symbol, the method comprising:

providing a vector having a front part, a center part and a back part, the center part being arranged in a plurality of consecutive blocks each including a first part and a second part, inserting in a time domain,
front pilot samples into the front part,
a plurality of consecutive blocks of samples into the center part,
back pilot samples into the back part, wherein the front pilot samples and the back pilot samples are configured to carry a similar correlation sequence, and wherein each of the plurality of consecutive blocks of samples is arranged in a first portion and a second portion which are configured to respectively match the first part and the second part of the center part, where each first portion includes pilot samples which are configured to carry a predetermined reference information and where at least one of the second portion includes data samples which are configured to carry signaling data, and performing a DFT-spread-OFDM modulation of the vector according to a predetermined oversampling rate, wherein time-domain samples of the vector are converted into the frequency domain by a discrete Fourier transform, DFT, operation, thereby creating frequency-domain samples, and the frequency-domain samples are converted into the time domain by an inverse discrete Fourier transform, IDFT, operation, thereby creating oversampled time-domain samples.

9. The symbol generation method according to claim 8, wherein the front part comprises a cyclic postfix part and the back part comprises a first cyclic prefix part, the method further comprising:

inserting, in the time domain,
cyclic postfix pilot samples into the cyclic postfix part, and
cyclic prefix pilot samples into the first cyclic prefix part, wherein the cyclic postfix pilot samples include a copy of a predetermined plurality of front pilot samples of the front part, and wherein the cyclic prefix pilot samples include a copy of a predetermined plurality of back pilot samples of the back part.

10. The symbol generation method according to claim 8, wherein prior to performing the DFT-spread-OFDM modulation, the method further comprises, scrambling the plurality of consecutive blocks of samples of the preamble symbol, according to a predetermined scrambling sequence.

11. The symbol generation method according to claim 8, wherein prior to performing the DFT-spread-OFDM modulation, the method further comprises, delaying in the time domain, the time-domain samples of the back part such that a first original sample associated with the back part is aligned onto a sampling time point of the DFT-spread-OFDM modulation, just as a first original sample associated with the front part is aligned onto a sampling time point of the MT-spread-OFDM modulation.

12. The symbol generation method according to claim 8, wherein the performing the DFT-spread-OFDM modulation comprises:

performing a separate DFT-spread-OFDM modulation for the back part, and applying in the frequency domain, a linear phase shift to the frequency-domain samples associated with the back part such that a first original sample associated with the back part is aligned onto a sampling time point of the DFT-spread-OFDM modulation, just as a first original sample associated with the front part is aligned onto a sampling time point of the DFT-spread-OFDM modulation.

13. A transmission method of transmitting a signal, the method comprising:

providing a preamble symbol generated according to the method according to claim 8, providing at least one signal frame comprising the generated preamble symbol, modulating the signal frame according to a predetermined multiplexing scheme, thereby creating a modulated signal, and transmitting the modulated signal over at least one transmission channel, wherein the signal frame comprises a second cyclic prefix part and wherein the providing the signal frame comprises, inserting, in the time domain, cyclic prefix pilot samples into the second cyclic prefix part of the signal frame, wherein the cyclic prefix pilot samples includes a copy of a predetermined plurality of front pilot samples of the front part of the preamble symbol.

* * * * *